Dec. 5, 1933.  H. E. TAUTZ  1,938,548
MACHINE TABLE EXTENSION
Filed Feb. 4, 1933  4 Sheets-Sheet 1

Inventor
HERBERT E. TAUTZ,
By Carl A. Hellmann
Attorney

Dec. 5, 1933.         H. E. TAUTZ         1,938,548
MACHINE TABLE EXTENSION
Filed Feb. 4, 1933         4 Sheets-Sheet 4

HERBERT E. TAUTZ,
By Carl A. Hillmann
Attorney

Patented Dec. 5, 1933

1,938,548

UNITED STATES PATENT OFFICE 1,938,548

MACHINE TABLE EXTENSION

Herbert E. Tautz, Milwaukee, Wis., assignor to Delta Manufacturing Company, Milwaukee, Wis.

Application February 4, 1933. Serial No. 655,279

32 Claims. (Cl. 143—174)

The present invention relates to machine tools, more particularly tools used in wood-working and driven by some source of motive power, such as an electric or other motor.

More specifically, one form of the invention relates to a circular saw having a table and extensions adapted to cooperate with said table to increase the range of work which may be handled by said machine. This invention relates to a further development and improvement of certain features of the invention disclosed in my co-pending application, Serial No. 681,768, for Machine tables, filed July 22, 1933.

These extensions are of two general types, first, extensions which are adapted to be attached to the forward edge of the table and to form a forward extension thereof, and, second, extensions which are adapted to increase the lateral range of the table by extending to one side thereof and affording supports for a work guide or saw gage, such as a rip gage, for instance.

The first mentioned type of extension has the effect of lengthening the front portion of the saw table, thus making it possible to handle lumber or other material of greater width when crosscutting or miter-cutting the same, while the second type of extension has for its main object to make it possible to rip wider material than the saw table could otherwise handle.

An obvious way to increase the range of a machine table, in both directions, would, of course, be to make the table of larger size. This obvious way is, however, attended with considerable practical objections, namely, in the first place, it would make the table extremely heavy and bulky, would require the machining of a greatly increased surface area and would require greater storage space. All of these features of the solid table would add materially to the expense thereof and a still further objection would occur, namely, if the machine table were solid it would be necessary to provide equal or approximately equal extensions of the said table on each side of the saw or other tool, or else to provide a suitable counter-balance on the shorter side, both of which matters would add further to the weight, space requirement and expense of the table.

This invention is particularly useful in connection with the smaller sizes of machine tables, especially saw tables, such as are used to a very great extent by amateur craftsman, by small wood-working shops and in other cases where small machines may be found satisfactory for either amateur or professional uses.

An underlying idea of the invention is to provide an ordinary relatively small saw table with detachable extensions for cross cutting or mitering and ripping purposes without adding excessively to the expense of manufacture of such saw tables, and so as to make it possible for the purchaser to acquire the saw with or without either type of extension or with both types, according to the nature of the work for which the saw is to be used. For example, a workman who desired to do considerable cross cutting of wide material and had no particular reason for ripping material of considerable width would find it desirable to purchase merely the front extensions for the table, while, on the contrary, a workman who had considerable ripping of wide stock to perform, and but little cross cutting, would need only the lateral extensions of the table and need not purchase the forward or cross cutting extensions. Of course, a workman who had considerable work of both types to do would apply both types of extensions to his saw table.

A feature of particular importance is the ease with which the extensions may be mounted or dismounted as required, which economizes the space necessary to accommodate the saw table, often a very important feature in a small commercial shop or an amateur's workshop.

While the forward extension of the table is usually made solid or continuous, in the preferred form of the invention, it is not necessary to provide a solid lateral extension and, therefore, in the preferred form of the present invention the lateral extension is provided by attaching a bar to the front of the ordinary table or to the front of the front extension and another bar to the rear of the table, these bars extending laterally of the original table to the desired distance and serving to support a rip gage at the desired distance from the saw blade.

When the material to be ripped is particularly thin and flexible it may be desirable to provide additional supporting means between the extensions to prevent the said material from sagging unduly between the two bars and thereby making it difficult to handle and saw properly. Suitable support for this purpose may be provided by attaching a relatively narrow strip to the lower surface of the rip gage and extending toward the saw table so as to provide a ledge for furnishing the desired support. This strip preferably, however, is removable from the rip gage and is removed therefrom when the rip gage is employed over the ordinary or continuous table of the saw.

For a clearer understanding of the invention, attention is directed to the accompanying drawings in connection with the following specification, wherein a preferred embodiment of the invention is disclosed. It will be understood, of course, that these drawings and the specifications descriptive thereof are merely illustrative and that the invention is not to be considered to be limited to the specific embodiment disclosed.

Figure 1:
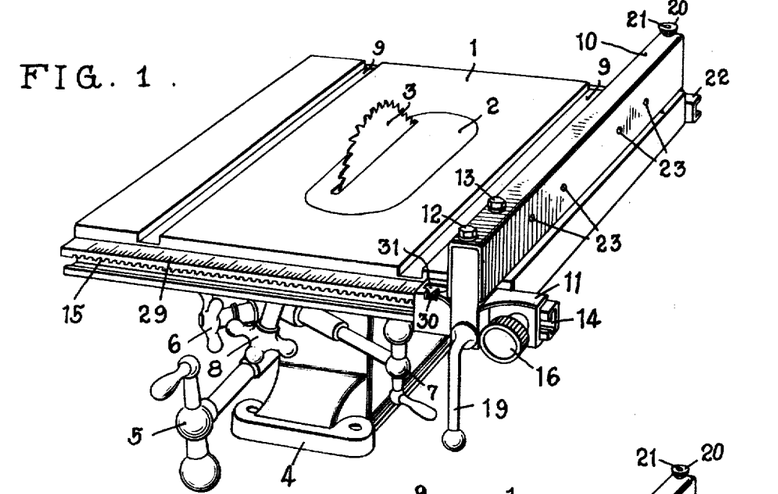
Fig. 1 is a somewhat diagrammatic perspective view of a machine embodying certain features of my invention.

Referring first to Fig. 1, I have illustrated certain features of my invention as applied to a circular saw comprising a saw table 1 having an insert 2 to receive the saw blade. This saw table is mounted upon a supporting means, 4, having suitable manipulating devices and clamping devices for adjusting the table 1 to various heights and inclinations with respect to the saw blade 3. These controls and clamping devices are shown here purely diagrammatically as they do not constitute a part of the present invention. 5 designates the means for raising and lowering the table and 6 the means for clamping said table in its resulting position, while 7 designates means for tilting the table and 8 the corresponding clamping means for retaining it in said tilted position. The top of the saw table 1 is provided with any desired number of grooves, indicated as 9, which are adapted to receive the customary miter gage, which is adapted to slide in said grooves and guide the work to the saw in cross cuttings or mitering operations.

In order to guide the workpieces in ripping operations a rip gage 10 is provided having a front fitting 11, secured thereto, for example, by bolts 12 and 13 which permit a slight adjustment of the bar 10 with respect to the fitting 11 in order to bring said parts into proper position, usually at right angles to one another, so that the guiding surfaces of the bar 10 may remain parallel to the plane of the saw 3. The fitting 11 slides upon a channel bar 14 which is provided with suitable rack teeth shown at 15. A knurled knob 16, having a shaft 17 journaled in the fitting 11, carries at the inner end of its said shaft 17 (see Fig. 7) a suitable pinion 18, said pinion 18 meshing with the rack teeth 15. The fitting 11 slides freely upon the channel bar 14 and may be adjusted rapidly and accurately to any desired position within its range by turning the knob 16 in the proper direction. A clamping rod or lever 19 is provided to clamp the fitting 11 to the channel bar 14 at any desired position to which it may be adjusted. A suitable clamping nut 20 cooperates with a screw 21 in a clamp mounted in the bar 10, near its rear end, and cooperating with a channel bar 22 to secure the rear end of the bar 10 firmly in an adjusted position and prevent yielding when the saw is used in ripping a workpiece. A number of holes 23, here shown as four, is provided in the rip gage 10 to facilitate attaching any desired auxiliary guides or the like thereto, for use in certain operations. The details of the fitting 11 and its cooperating parts whereby it may be adjusted with respect to the channel bar 14 and then clamped in its adjusted position, are illustrated in Figs. 5, 6, 7 and 8 and will be described more fully hereinafter. The details of the rear clamping means for the rip gage, shown in Figs. 9 and 10 will also be described more fully subsequently in the present specification.

Figures 2, 11:
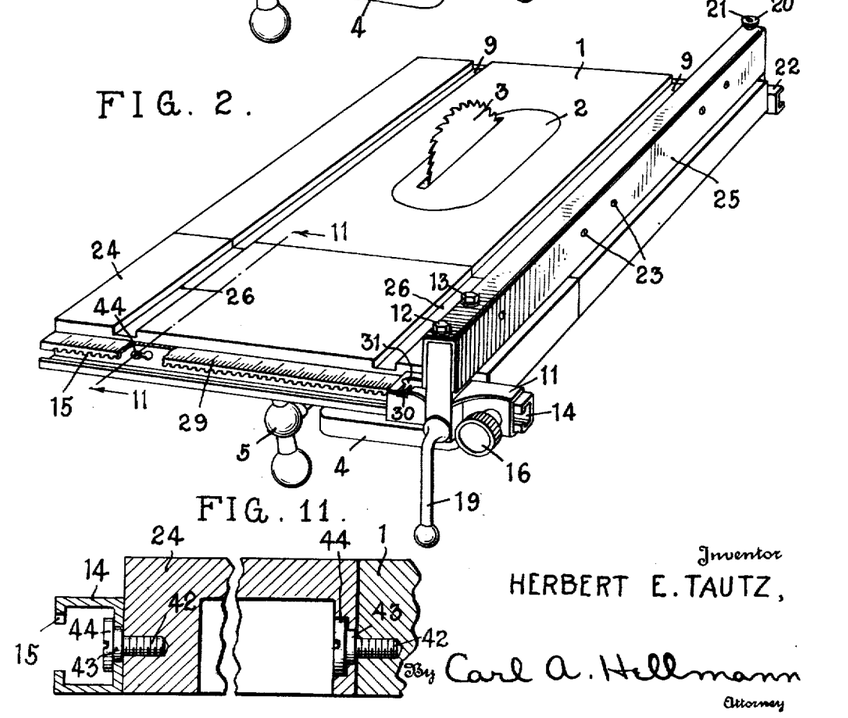
Fig. 2 is perspective view illustrating the top or table of the machine illustrated in Fig. 1, with a front extension applied thereto.
Fig. 11 is a detail showing how the front rack bar, or the front extension, is secured to the table top by means of screws and keyhole slots

Referring now to Fig. 2, it will be noted that the saw table 1, insert 2, saw 3, grooves 9, rear channel bar 22, front channel bar 14, fitting 11, operating knob 16, clamp 19, etc., remain exactly the same as in Fig. 1, but that an additional section or extension 24 has been attached in front of the table 1 and between it and the channel bar 14. This necessitates, of course, the use of a longer rip gage, here shown as 25, but which is otherwise identical with the rip gage 10 illustrated in Fig. 1. The section 24 which has been interposed between the original saw table 1 and the channel bar 14 is made to conform to the top surface of the original table 1, that is, it forms a continuation of the top surface of said table 1 and has cut in it also continuations 26 of the grooves 9. This section or extension 24 when securely fastened in any suitable way to the table 1 in proper alinement therewith, has the effect of lengthening the forward portion of the saw table and permitting the same miter gages to cooperate with the table, as the ones originally used with the table 1 of Fig. 1, thus having the same effect as though the table 1 were increased in length at its forward portion and permitting the cross cutting or miter cutting of much wider material than the table shown in Fig. 1.

An important feature of this provision of an extension for the saw table is that certain purchasers of the saw may have no need for the long forward table portion and find the same undesirable for some reason or other, as well as a needless expense when not necessary. Such users of the saw will be provided with the machine made as illustrated in Fig. 1. If they should later find need for an increased forward length of the saw table to handle wider material when cross cutting or mitering, the extensions are available to them at a slight additional expense and may be atttached by the users to the original table, thus virtually increasing the size and capacity of the saw table. Those purchasers who have need of the greater capacity initially can, of course, buy the saw provided with the extension in the first place and thus the saw table is made much more flexible and adjustable to the needs of various users and does not penalize the one who needs only a short table by providing him with a long table and making him bear the expense thereof, while at the same time those users who desire this feature have it readily available to them.

Figures 3, 9, 10:
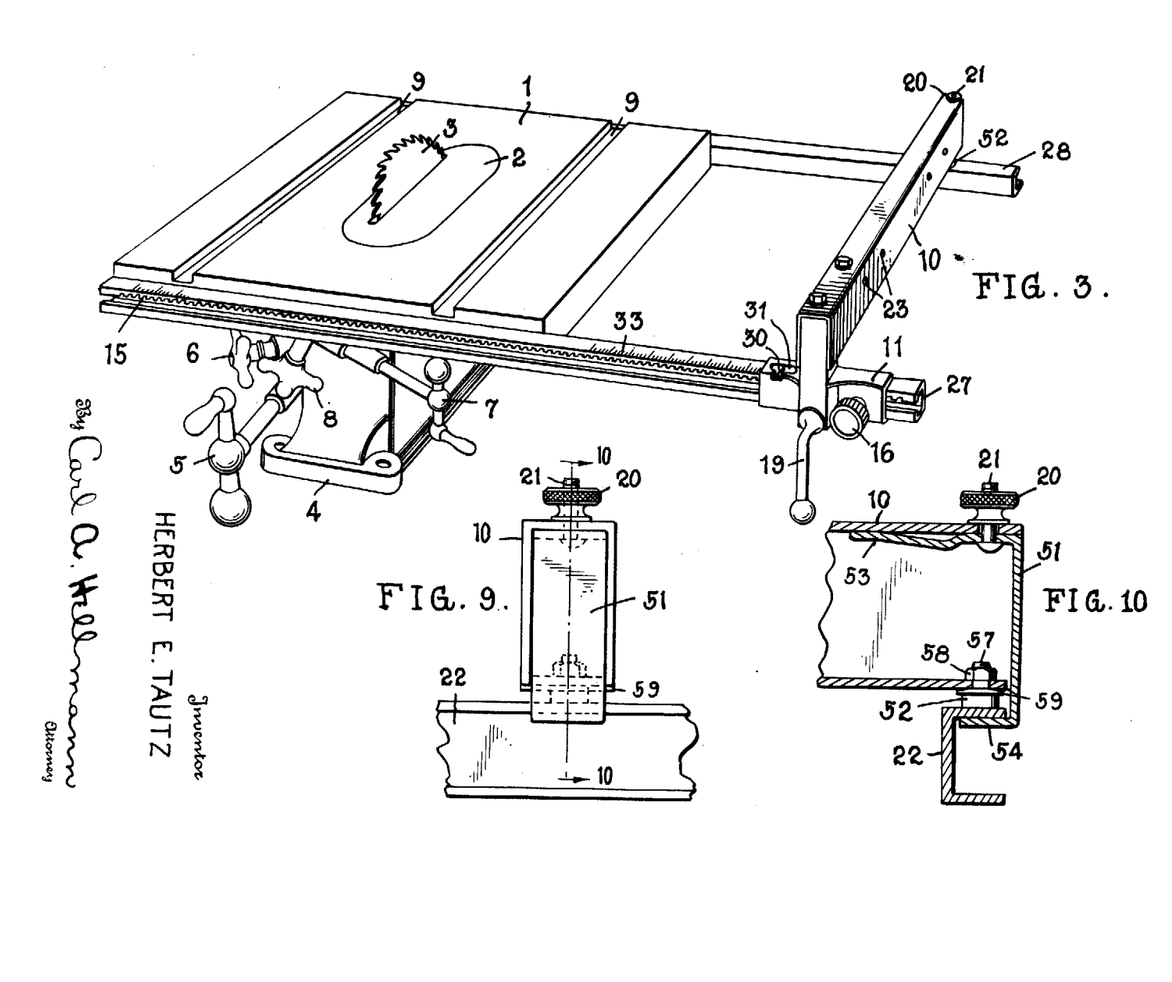
Fig. 3 is a perspective view showing the machine illustrated in Fig. 1 with lateral or rip gage supporting extensions applied thereto.
Fig. 9 is a detail showing the structure of the rear end of the rip gage, particularly the means for clamping it to the rear extension bar.
Fig. 10 is a section through Fig. 9 on the line 10—10, looking in the direction of the arrows.

Referring now to Fig. 3, there is shown a further modification of the machine illustrated in Fig. 1, in this case adapting the machine for ripping wider material than could be accommodated by the machine of Fig. 1. It will be noted that here the saw table 1, with the insert 2 and the saw 3 and the grooves 9, remains the same as in Fig. 1, but that the channel bars 14 and 22 of Fig. 1 have been replaced by longer channel bars 27 and 28. The rip gage structure comprising the bar 10, the fitting 11 and the auxiliary operating parts thereof are identical with the corresponding parts of Fig. 1. In fact, the sole difference between the machine shown in Fig. 3 and that shown in Fig. 1 is that the channel bars 14 and 22 have been lengthened, as shown at 27 and 28, respectively. This extension of the said channel bars makes it possible to move the rip gage to positions much further from the saw blade 3, maintaining it always parallel to said saw blade, so that the width of the material which may be ripped is correspondingly increased.

Figures 4, 12:
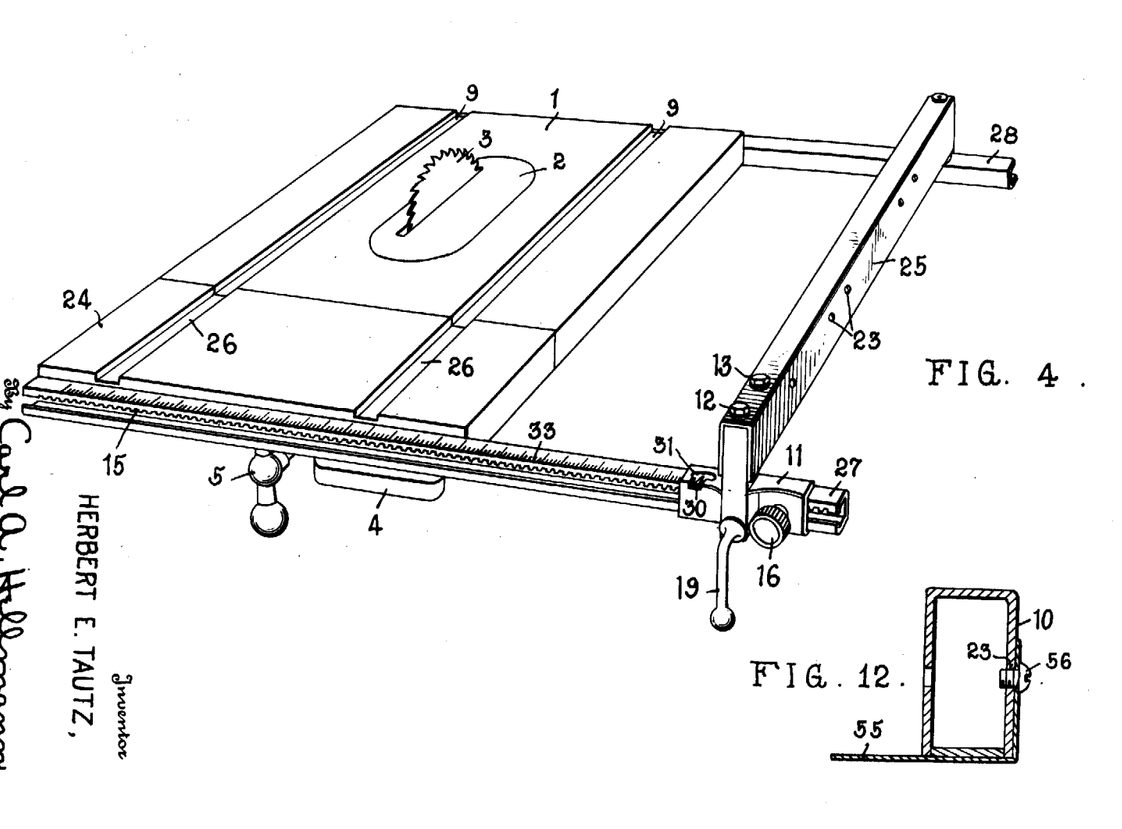
Fig. 4 is a perspective view showing the table top having both the front extension and the lateral extensions applied thereto simultaneously.
Fig. 12 is a detail showing a work supporting device removably secured to the gage bar.

Referring now to Fig. 4, there is illustrated a still further application of the invention to the machine of Fig. 1, namely, the forward extension 24 has been secured to the front end of the table 1 and the long channel bars 27 and 28 have been secured to the front end of the extension piece 24 and the rear end of the table 1, respectively, as shown, thus providing a saw table which can operate on unusually wide material, in both cross cutting or mitering, and ripping operations. The rip gage in Fig. 4 is identical with that shown in Fig. 2 in all its details and, therefore, need not be described further as to its general arrangement and purpose.

It will be noted that the channel bar 14 of Figs. 1 and 2 is provided with a scale 29 and that the fitting 11 carries a pointer 30 cooperating with the said scale. An aperture 31, in the upper part of the fitting 11, permits the scale 29 to be seen through the said fitting 11 and a screw 32 fitting loosely through a hole in the pointer 30 permits a slight adjustment of the said pointer 30 to adjust its reading on the scale 29. The graduations on the scale are so arranged in cooperation with the position of the saw blade 3 and the pointer 30 that the said pointer, when adjusted in correspondence with the thickness of the saw blade in use at the time being, will correctly indicate the distance between the surface of the saw blade 3 and the adjacent surface of the rip gage bar 10, so that the pointer when properly adjusted will indicate correctly the width to which material will be ripped with the setting in question. This is a very useful and time saving feature and eliminates the necessity of applying a measuring scale between the saw blade and the rip gage to determine the width of the resulting material when ripped.

Similar graduations 33 are preferably provided upon the channel bars 27, shown in Figs. 3 and 4 and will cooperate with the same pointer 30.

Figure 5:
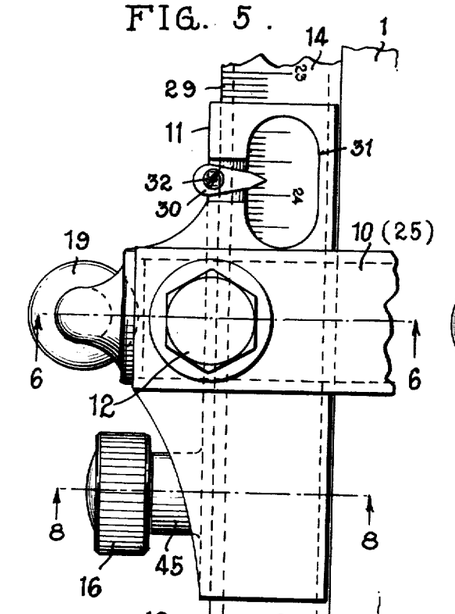
Fig. 5 is a plan view, partly broken away, showing a detail of the structure of the front end of a rip gage used in connection with my invention, and showing a portion of an extension bar cooperating therewith.
Figure 6:
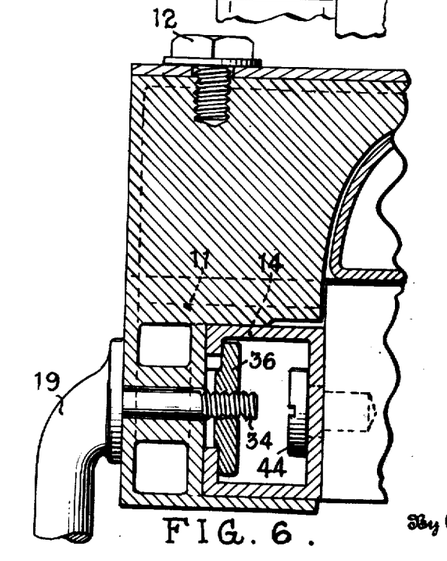
Fig. 6 is a fragmentary sectional view showing the end structure of the device illustrated in Fig. 5, the section being made on the line 6—6 of Fig. 5, looking in the direction of the arrows.
Figure 7:
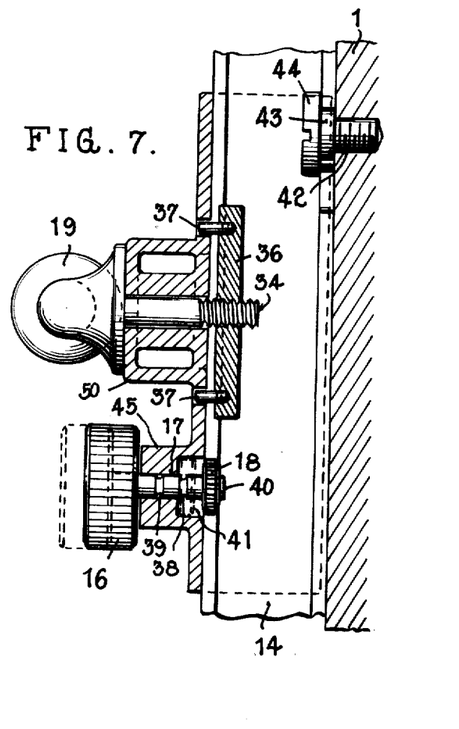
Fig. 7 is a longitudinal section through the structure shown in Fig. 5 in a plane parallel to the table top.

Referring now to Figs. 5, 6, 7 and 8, which disclose details of the fitting 11 and the adjacent end of the rip gage bar 10 or 25, as the case may be, there is illustrated on an enlarged scale the aperture 31, in the fitting 11, with the pointer 30 extending into the said aperture and secured to the fitting 11 by means of the screw 32, which permits slight lateral and/or pivotal adjustments of the said pointer 30 so as to cause it to designate the desired graduations of the scale 29. Fig. 7 shows how the channel bar 14 is secured to the front of the table 1 (or of its extension 24, as the case may be). This may be accomplished by means of a screw 44 having a shoulder portion 43 and a threaded portion 42 of smaller diameter, so that when the said screw is screwed as far as it will go into the member 1 the shoulder portion 43 will not quite abut against the same, thus permitting the head of the screw 44 to clamp the rear web of the channel member 14 firmly against the adjacent edge of the table 1. The said web of the channel 14 is provided with several key-hole slots for this purpose, the circular portion of the key-hole being of suitable diameter to clear the head of the screw and the tail or slot of the key-hole being of proper width to fit on the shoulder portion 43 of the said screw.

The rip gage bar 10 may be adjustably secured to the fitting 11 by means of the bolts or the like 12 and 13. This permits adjustment of the rip gage to the desired angular relation to the member 11, ordinarily a right angle. It will be understood, of course, that the adjustment mentioned is a very slight one and is provided by reason of the fact that the bolts 12 and 13 fit loosely through the bar 10, so that by loosening these bolts a slight angular adjustment of the bar 10 may be secured and thereafter retained by again tightening said bolts. In manufacturing the device there will be slight deviations from the true right angle position desired, and it is these small deviations which are to be corrected by this means.

Figure 8:
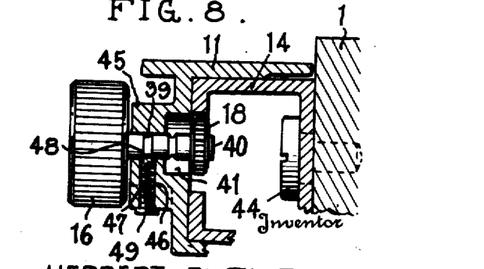
Fig. 8 is a fragmentary, partially sectional elevation, taken on the line 8—8 of Fig. 5, looking in the direction of the arrows.

In order to adjust the rip gage to the desired distance from the saw blade there is provided a knob 16 attached to a shaft 17, as shown in Figs. 7 and 8. The said shaft 17 carries the pinion 18, already described, which meshes with the rack teeth in the front channel bar. Upon turning the knurled knob 16 the fitting 11 carrying the rip gage 10 will obviously be moved in one direction or another along the channel bar 14, thus making it possible to adjust the same very accurately to the desired distance from the saw blade. However, at times it may be desirable to provide for rapid motion of the fitting 11 along the said channel bar, and in order to make it possible to permit such rapid motion, the shaft 17 is arranged to slide longitudinally within its bearing lug 45. Said lug is provided with a recess or bore 41 of sufficient internal diameter to receive the pinion 18 when the shaft 17 is moved forwardly. When so moved the pinion 18 will obviously be out of engagement with its rack and the fitting may then be moved rapidly by hand, by merely sliding it along the bar 14 into the desired position, or approximately the desired position. If a greater approach to accuracy is desired, the shaft 17 may then again be pushed rearwardly so as to cause the pinion 18 to mesh with the rack teeth in the channel bar and the final delicate adjustment of the position of the rip gage may then be made by a slight turn of the knurled knob 16 in one direction or the other.

In order to hold the shaft 17 in its desired position, it may be provided with two circumferential grooves 38 and 39 spaced apart a distance corresponding to the desired extent of axial motion of the pinion 18. The lug 45 is provided with a bore 46 in which is housed a spring 47, bearing against a ball 48 at one end and bearing at its other end against a screw 49, threaded into the outer end of the said bore. The inner end of the bore may be slightly reduced in diameter, as shown, to prevent the ball from passing through the same. The result of this construction is that the ball will be continually pressed inward and will engage either in groove 39 or in groove 38 of the shaft 17, as the case may be, with sufficient force to prevent accidental shifting of the said shaft when not desired.

When the rip gage and the member 11 have been adjusted to the desired position it will ordinarily be desirable to clamp them firmly in such position to prevent accidental derangement. This may be accomplished, as shown in Figs. 5, 6 and 7, by means of a handle 19 having at one end a screw-threaded member 34, passing through a lug 50 formed in the member 11. A preferably rectangular nut 36 is engaged by the screw-threaded portion 34 and bears against the inside of the front inwardly bent flanges of the channel bar 14. Short pins 37 may be secured to either the member 11 or the nut 36 and loosely engaged in the other of said members, to serve as guides for the nut 36 and prevent it from turning when the handle 19 is turned. This construction is best shown in Fig. 7. Upon turning the handle 19 in the proper direction to tighten the screw 34, the member 36 will thereby be drawn toward the adjacent surface of the fitting 11, thereby clamping the member 11 securely against the front flanges of the channel bar, which are interposed between the nut 36 and the fitting 11, as already mentioned.

While the channel bar 14 has been referred to specifically in describing the features involved in Figs. 5, 6, 7 and 8, it will be obvious that the channel bar 27 will also cooperate with the fitting 11 and its pertinent parts in precisely the same manner as the channel bar 14, and it is, therefore, not necessary to repeat the description with respect to the said channel bar 27.

It will be obvious that the rear channel bar 22 or the long rear channel bar 28, may be secured to the rear edge of the table 1 in precisely the same way as the front channel bars. The rip gage 10 may be steadied and may be made very rigid by clamping its rear end to the said rear channel bar 22 or 28, as the case may be. This may be accomplished as best shown in Figs. 9 and 10. In said figures there is shown a U-shaped movable clamping member 51 adapted to engage under the upper flange of the rear channel bar and having a screw 21 cooperating therewith, said screw having its shank passing through the upper surface of the rip gage bar 10 and cooperating with a nut 20. By tightening the said nut 20 against the rip gage the member 51 will secure the said end of the bar 10 to the corresponding channel bar and thus prevent any yielding of the bar at its rear end.

In order to prevent unduly straining the rear channel bar 22 a spacer member 52 may be provided to take up the reaction when the clamp screw 20 is tightened to bring the U-shaped member 51 into engagement with the lower surface of the upper flange of the said bar 22. The effect will be that the spacer 52 will become securely clamped between the lower surface of the gage bar 10 and the upper surface of the upper flange of the channel member 22, thus preventing the channel member 22 from being displaced or strained out of its proper position when the nut 20 is tightened. To maintain the member 51 properly in place it may be provided with a tail piece 53 of sufficient length, extending into the interior of the rip gage bar, and normally lying near the inside upper surface of the said bar. This tail piece 53 at the same time will prevent the U-shaped member 51 from turning about the axis of the screw 21 when the nut is tightened to bring the lower arm 54 of the said U-shaped member 51 into contact with the upper flange of the channel bar 22. It will be noted that the rip gage element 10 is preferably made hollow. The structure of said rip gage bar itself forms no part of the invention claimed herein, but constitutes the basis of a separate application for patent, Serial No. 656,945 filed Feb. 15, 1933.

In operation, the machine involving the features of the present invention may be used just like any other machine of similar nature, except that when desired the table extension may be used to increase the capacity of the machine for cross cutting, or the channel bars may be attached to the table to increase the ripping capacity, or both may be used simultaneously.

It should be noted that all of these parts may be readily attached to or removed from the saw table 1 and that the front channel bar may cooperate with either the saw table 1 or with the front cross cutting extension thereof, the said parts being provided with cooperating screw-threaded apertures and keyhole slots which are properly spaced so that they can cooperate with one another interchangeably. In other words, the same screws which hold the channel bar 14 to the front of the saw table will serve also to hold the long ripping channel bar 27, or to hold the front table extension 24. The said front table extension 24 also has screw-threaded apertures in its front surface placed exactly the same as those in the front of the table 1 and in its rear flange has keyhole slots exactly like those in the channel bars, so that the table extension may be held to the table 1 by the same screws that would otherwise hold the channel bars, and the said channel bars in turn may be secured to the front of the extension member by screws placed similarly to those on the front flange of the table top 1.

Attention is also directed to the fact that while it is not necessary to remove the various extensions from the table unless specifically desired by the user, nevertheless such removal is made very easy by reason of the fact that the keyhole slots provided in the various members have the enlarged circular ends of the keyholes of sufficient size to pass over the heads of the securing screws and the narrow parts of the keyhole slots of proper width to correspond to the shoulder parts of said screws so that it is necessary merely to loosen the screws slightly in order to slide the attachments to one side sufficiently to make it possible for the large parts of the keyhole slots to clear the heads of the screws and thus permit the removal of the said attachments. The fitting 11 has a relatively long bearing surface resting against the front flanges of the front channel bar 14 or 27, as the case may be, serving thus like the head of a T-square to properly aline the rip gage bar 10 into parallelism with the saw blade 3. This alinement is produced automatically when the handle 19 is rotated to tighten the nut 36 against the inner sides of the said front flanges, after the correct adjustment of the position of the fitting 11 has been made by means of the pinion with its knurled knob 16, or by sliding the same freely by hand when the pinion is disengaged from its rack. This disengaging of the pinion is accomplished easily by merely pulling the knob 16 forward and obviously the said parts may be re-engaged when desired by the reverse operation of pushing the knob 16. During these operations the rear securing means 51 is preferably left rather loose so as not to interfere with the free movement of the rip gage toward or from the saw blade.

While the front fitting alone, when properly clamped by means of the handle 19, will hold the rip gage bar 10 sufficiently tightly for many purposes, in case relatively heavy work is to be done, it is preferable to tighten the rear clamp 51 by means of its nut 20 and screw 21 to anchor the said rip gage bar 10 firmly against the rear channel bar and thus prevent accidental displacement or yielding of said end of the bar. This feature is useful also where a definite setting of the rip gage is to be maintained for a number of operations, in order to prevent any possibility of gradual creep or yielding of the gage bar which, though relatively slight for each individual operation, might otherwise accumulate into considerable error between the first piece and the last piece to be cut.

Of course, rip gage bars 10 and 25 of different lengths are desirable to cooperate with the saw table when the extension piece 24 is not used and when it is used, respectively, although it may be possible to use only the short bar 10 even with the extension 24, however, in such case sacrificing many of the advantages of the long bar, especially the advantage secured by reason of the clamping means 51, which obviously cannot be used with the short bar 10 when the extension 24 is in place.

It will be obvious that numerous changes may be made in various details and structures of different portions of the machine, and that many advantages of the invention may be attained without utilizing all of the features disclosed in the present case. Therefore, the present invention is not to be considered to be limited to the specific devices illustrated, but for a clear understanding of the features covered by the invention, attention is directed to the claims appended to the present description.

It will be evident that the front channel bar, 14 or 27, as the case may be, constitutes a guide track upon which, in the specific case illustrated, there runs a pinion 18. However, it should be clearly understood that it is not necessary in all cases to provide rack teeth on the guide track and corresponding teeth on the pinion. It is evident that both of these members may be substantially smooth, whereupon, instead of a pinion or gear wheel 18, an ordinary wheel having a substantially smooth peripheral surface may be employed, which will drive the fitting 11 along the guide track frictionally instead of by means of gear teeth. In fact, friction gearing is usually considered to be gearing with an infinite number of teeth, of infinitesimal size, and is to that extent an actual toothed gearing. Slippage might, of course, occur where such friction drive is used instead of gears with conventional gear teeth, which constitute a positive drive, but such slippage will make no material difference in the actual operation of the device. It should, therefore, be clearly understood that when the term "guide track" is employed in the appended claims this track need not be provided with teeth, but may be a smooth track, cooperating with a friction wheel or the like instead of a conventional toothed wheel, in other words, the term "guide track" is to be construed broadly.

In order to prevent yieldable or flexible material, when being sawed, from bending downward and catching against the front surface of the extension bar 28, during the ripping operation, it may be desirable to secure a supporting ledge 55 to the lower surface of the rip gage bar 10, extending toward the saw 3, and arranged at a level as high as, or higher than, the upper surface of the bar 28, in order to guide the material safely over the said rear channel bar.

This ledge 55 may extend as far as desired along the bottom of the rip gage bar 10 and is preferably removably secured thereto, for example, by means of screws 56 or the like, passing through holes in the ledge member and threaded into the outside of the rip gage bar. Such ledge member 55 is not at all necessary, but is an added convenience that may be utilized when a considerable amount of ripping of wide pieces of very flexible material is to be done, inasmuch as it will automatically prevent the leading corner of the said material from catching against the rear channel bar when being ripped.

Having thus described my invention and explained some of the advantages thereof, I claim:

1. A machine tool having a table for guiding the work and a mechanically driven tool cooperating with the said table to operate upon the said work, an extension member for the said table, means for removably securing the said extension member to the table whereby to provide an extension surface which is substantially a continuation of the work-guiding surface of the table, supporting means removably secured to the free edge of the extension member and to the opposite edge of the table respectively and extending laterally of the said table and of the extension member to at least one side, and a work-guiding element supported by the said supporting means and the lateral extensions thereof.

2. A machine tool having a table for guiding the work and a mechanically driven tool cooperating with the said table to operate upon the said work, an extension member for the said table, means for removably securing the rear edge of the said extension member to the front edge of the table whereby to provide an extension surface which is substantially a forward continuation of the work-guiding surface of the table, channel members removably secured to the rear edge of the table and the front edge of the extension member respectively and extending laterally of the said table and of the extension member to at least one side, and a work-guiding element slidably supported by the said channel members and their lateral extensions.

3. A machine tool having a table for guiding the work and a mechanically driven tool cooperating with the said table to operate upon the said work, the said table having a substantially plane upper surface and a front surface at an angle thereto, the said front surface having securing means attached thereto, a member having a guide track, and removably secured to the said front surface of the table by the said means, the said track member being of materially greater length than the said front surface and extending laterally beyond the same, at at least one end, a work-guiding gage arranged to move over the top of the table, means slidably securing the said gage to the said track member, and a rotary member carried by the said means and in engagement with the said track member, whereby rotation of the said rotary member will cause the said gage to be moved across the table.

4. A machine tool having a table for guiding the work and a mechanically driven tool cooperating with the said table to operate upon the said work, the said table having a substantially plane upper surface and a front surface at an angle thereto, the said front surface having securing means attached thereto, a member having a guide track, and removably secured to the said front surface of the table by the said means, the said member being of materially greater length than the said front surface and extending laterally beyond the same, at at least one end, a work-guiding gage arranged to move over the top of the table, means slidably securing the said gage to the said track member, a wheel, a shaft carrying the said wheel, the said shaft being mounted in the said slidable means, and means for actuating the said shaft, the said shaft being mounted to have longitudinal play in its bearings, and when in one position bringing the wheel into engagement with the track, while disengaging the said wheel from the track in another position.

5. A machine tool having a table for guiding the work and a mechanically driven tool cooperating with the said table to operate upon the said work, the said table having a substantially plane upper surface and a front surface at an angle thereto, the said front surface having securing means attached thereto, a member having a guide track, and removably secured to the said front surface of the table by the said means, the said member being of materially greater length than the said front surface and extending laterally beyond the same, at at least one end, a work-guiding gage arranged to move over the top of the table, means slidably securing the said gage to the said guide track member, a wheel, a shaft carrying the said wheel, the said shaft being mounted in the said slidable means, means for actuating the said shaft, the said shaft being mounted to have longitudinal play in its bearings, and when in one position bringing the wheel into engagement with the track, while disengaging the said wheel from the track in another position, and means cooperating with the said shaft to hold it against accidental displacement in either of the said adjusted positions.

6. A machine tool having a table for guiding the work and a mechanically driven tool cooperating with the said table to operate upon the said work, the said table having a substantially plane upper surface and a front surface at an angle thereto, the said front surface having securing means attached thereto, a member having a guide track, and removably secured to the said front surface of the table by the said means, the said member being of materially greater length than the said front surface and extending laterally beyond the same, at at least one end, the said table having a rear surface extending at an angle to the top, the said rear surface having securing means attached thereto, a bar removably secured to the said rear surface of the table by the said means, the said bar being of materially greater length than the said rear surface and extending laterally beyond the same at at least one end, a work-guiding gage arranged to move over the top of the table and means for securing it to the track member and to the bar near its respective ends.

7. A machine tool having a table for guiding the work and a mechanically driven tool cooperating with the said table to operate upon the said work, the said table having a substantially plane upper surface and a front surface at an angle thereto, the said front surface having securing means attached thereto, a member having a guide track, and removably secured to the said front surface of the table by the said means, the said member being of materially greater length than the said front surface and extending laterally beyond the same, at at least one end, the said table having a rear surface extending at an angle to the top, the said rear surface having securing means attached thereto, a bar removably secured to the said rear surface of the table by the said means, the said bar being of materially greater length than the said rear surface and extending laterally beyond the same at at least one end, a work-guiding gage arranged to move over the top of the table, means cooperating with one end of the said gage and slidably securing it to the track member, a wheel carried by the said means and in engagement with the track, whereby rotation of the said wheel will cause the said gage to be moved across the table, and means cooperating with the rear end of the work-guiding gage and with the said bar, for securing the said end to the said bar when desired.

8. A machine table having a substantially plane upper surface, a mechanically driven tool adjacent the said surface, to operate on a workpiece lying on the surface, a guide for the workpiece, and means for adjusting the said guide with respect to the table, and said means comprising a track bar secured to the table and a wheel in engagement with the track, the said wheel being mounted in the guide.

9. A machine table having a substantially plane upper surface, a mechanically driven tool adjacent the said surface, to operate on a workpiece lying on the surface, a guide for the workpiece, and means for adjusting the said guide with respect to the table, the said means comprising a track bar secured to the table, a wheel in engagement with the track, the said wheel being mounted in the guide, the guide being provided with a portion engaging the track bar and substantially at right angles to the length of the guide, and means for clamping the said portion to the track bar to secure the guide in its adjusted position.

10. A machine table having a substantially plane upper surface a mechanically driven tool adjacent the said surface, to operate on a workpiece lying on the surface, a guide for the workpiece, and means for adjusting the said guide with respect to the table, the said means comprising a track bar secured to the table, a wheel in engagement with the track, the said wheel being mounted in the guide, the track bar carrying a scale, a pointer and means for securing the said pointer adjustably to the guide to indicate the position of the guide with respect to the tool.

11. A machine tool having a table for guiding the work and a mechanically driven tool cooperating with the said table to operate upon the said work, the said table having a substantially plane upper surface and a front surface at an angle thereto, the said front surface having securing means attached thereto, a member having rack teeth therein, removably secured to the said front surface of the table by the said means, the said member being of materially greater length than the said front surface and extending laterally beyond the same, at at least one end, a work-guiding gage arranged to move over the top of the table, means slidably securing the said gage to the said rack-toothed member, and a pinion carried by the said means and in mesh with the rack teeth, whereby rotation of the said pinion will cause the said gage to be moved across the table.

12. A machine tool having a table for guiding the work and a mechanically driven tool cooperating with the said table to operate upon the said work, the said table having a substantially plane upper surface and a front surface at an angle thereto, the said front surface having securing means attached thereto, a member having rack teeth therein, removably secured to the said front surface of the table by the said means, the said member being of materially greater length than the said front surface and extending laterally beyond the same, at at least one end, a work-guiding gage arranged to move over the top of the table, means slidably securing the said gage to the said rack-toothed member, a pinion, a shaft carrying the said pinion, the said shaft being mounted in the said slidable means, means for actuating the said shaft, the said shaft being mounted to have longitudinal play in its bearings, and when in one position bringing the pinion into mesh with the rack, while disengaging the said pinion from the rack in another position, and means cooperating with the said shaft to hold it against accidental displacement in either of the said adjusted positions.

13. A machine tool having a table for guiding the work and a mechanically driven tool cooperating with the said table to operate upon the said work, the said table having a substantially plane upper surface, an extension member, means for removably securing the said extension member to the said table, the extension member having a substantially plane upper surface, the said upper surface lying in substantially the same plane as the top of the table when the extension member is secured to the table, whereby the upper surfaces of the table and of the extension member form substantially a continuous, plane, work-receiving surface when the extension member is secured to the table, an extension bar removably secured to the table at the opposite side from the said extension member, the said extension bar extending laterally beyond the said table at at least one side, and a similar extension bar removably secured to the free side of the extension member and also extending laterally beyond the said extension member at at least the said one side, the said extension bars serving to receive and guide a work-guiding gage upon, and also beyond, the surfaces of the table and of the extension member attached thereto.

14. A machine tool having a table for guiding the work and a mechanically driven tool cooperating with the said table to operate upon the said work, the said table having a substantially plane upper surface, an extension member, means for removably securing the said extension member to the said table, the extension member having a substantially plane upper surface, the said upper surface lying in substantially the same plane as the top of the table when the extension member is secured to the table, whereby the upper surfaces of the table and of the extension member form substantially a continuous, plane, work-receiving surface when the extension member is secured to the table, an extension bar removably secured to the table at the opposite side from the said extension member, the said extension bar extending laterally beyond the said table at at least one side, and a similar extension bar removably secured to the free side of the extension member and also extending laterally beyond the said extension member at at least the said one side, the said extension bars serving to receive and guide a work-guiding gage upon, and also laterally beyond, the surfaces of the table and of the extension member attached thereto, the extension bar attached to the extension member being constructed to be secured at will to the table or to the extension member, the table and the extension member being provided with suitable interchangeable securing means for this purpose.

15. A machine tool having a table for guiding a workpiece, a mechanically driven tool cooperating with the said table to operate upon the said workpiece, a work-guiding gage, means cooperating with the table to move the said gage with respect to the same, means to maintain it always parallel to its initial position, means for indicating the distance between the said gage and the tool, the said means comprising a scale arranged on one element and a pointer arranged on the other to cooperate with the said scale, the said pointer being adjustable with respect to the element carrying it, means for securing the said gage in position with respect to the table at one end when the said distance has been adjusted as desired, and further, independent, means for securing the other end of the gage in position with respect to the table.

16. A machine tool having a table for guiding a workpiece, a mechanically driven tool cooperating with the said table to operate upon the said workpiece, a work-guiding gage, means cooperating with the table to move the said gage with respect to the same, means to maintain it always parallel to its initial position, means for indicating the distance between the said gage and the tool, the said means comprising a scale arranged on the table and an adjustable pointer on the gage, permitting adjustment of the said pointer with respect to the gage, means for securing the said gage in position with respect to the table at one end when the said distance between the tool and the gage has been adjusted as desired, and further, independent, means for securing the other end of the gage in position with respect to the table.

17. A machine tool having a table for guiding a workpiece, a mechanically driven tool cooperating with the said table to operate upon the said workpiece, a work-guiding gage movable over the said table, extension bars attached to the table, the said bars extending beyond the table at at least one side thereof, the gage being supported by the said bars, and means for preventing the workpiece from sagging, secured to the said gage, the said means comprising a relatively thin sheet metal member of L-shaped cross section, one arm of the L being attached to one side of the gage and the other arm extending beneath the gage and toward the tool.

18. In a power tool, a rotating tool, a table having a guideway perpendicular to the plane of operation of said tool, a work guide adjustable relative to said guideway along one edge of said table and disposed parallel to said plane, supporting means for one end of said guide adjustable in said guideway and disposable beyond an intersecting edge of said table, and supporting means for the opposite end of said guide extending beyond said intersecting edge of the table and relative to which said guide is adjustable.

19. In a power tool, a rotating tool, a table having a guideway perpendicular to the plane of operation of said tool, a work guide adjustable relative to said guideway along one edge of said table and disposed parallel to said plane, supporting means for one end of said guide adjustable in said guideway and disposable beyond an intersecting edge of said table, supporting means for the opposite end of said guide extending beyond said intersecting edge of the table and relative to which said guide is adjustable, and adjustable means for positioning said guide on said last mentioned supporting means.

20. The combination with a power saw, of a table therefor provided with a guideway perpendicular to the plane of operation of said saw, gage carrying and positioning means adjustable laterally along said guideway, a rip gage member connected at one end to said means and extending therefrom longitudinally of the table parallel to said saw and disposable upon lateral adjustment of said means laterally beyond one side of said table, means carried by said table for supporting the opposite end of said rip gage member when so disposed, and means for positioning said opposite end of the latter against outward lateral springing relative to said supporting means during use of the saw.

21. The combination with a power saw, of a table therefor provided with a guideway perpendicular to the plane of operation of said saw, gage carrying and positioning means adjustable laterally along said guideway, a rip gage member connected at one end to said means and extending therefrom longitudinally of the table parallel to said saw, and disposable upon lateral adjustment of said means laterally beyond one side of said table, means carried by said table and projecting laterally beyond said side for supporting the opposite end of said rip gage member when so disposed, and means for positioning said opposite end of the latter against outward lateral springing relative to said supporting means during use of said saw when said gage member is disposed laterally beyond said side of the table.

22. The combination with a power saw, of a table provided with a guideway perpendicular to the plane of operation of said saw, gage carrying and positioning means adjustable laterally along said guideway, a rip gage member connected at one end to said means and extending therefrom longitudinally of the table parallel to said saw and disposable upon lateral adjustment of said means either over said table or laterally beyond one side of the latter, means carried by said table for supporting the opposite end of said gage member when laterally beyond the table in the same plane as when over said table, and means for fixing said opposite end of said gage member in any position thereof on said supporting means against outward lateral movement relative to the latter during use of the saw.

23. The combination with a power saw, of a table provided with a guideway perpendicular to the plane of operation of said saw, gage carrying and positioning means adjustable laterally along said guideway, a rip gage member connected at one end to said means and extending therefrom longitudinally of the table parallel to said saw and disposable upon lateral adjustment of said means either over said table or laterally beyond one side of the latter, means carried by said table and projecting laterally beyond said side for supporting the opposite end of said gage member when laterally beyond the table in the same plane as when over said table, and means for fixing said opposite end of said gage member when over said table or in any position of said member on said supporting means against outward lateral movement relative to the latter during use of the saw.

24. The combination with a power saw, of a table provided with a guideway perpendicular to the plane of operation of said saw, gage carrying and positioning means adjustable laterally along said guideway, a rip gage member connected at one end to said means and extending therefrom longitudinally of the table parallel to said saw and disposable upon lateral adjustment of said means laterally beyond one side of said table, means carried by said table for supporting the opposite end of said gage member, and means for fixing said opposite end of said gage member in any position thereof on said supporting means against outward lateral movement relative to the latter during use of the saw comprising a gage holding member likewise adjustable at will along said supporting means and means for at will connecting or disconnecting said last mentioned member and said supporting means.

25. The combination with a power saw, of a table provided with a guideway perpendicular to the plane of operation of said saw, gage carrying and positioning means adjustable laterally along said guideway, a rip gage member connected at one end of said means and extending therefrom longitudinally of the table parallel to said saw and disposable upon lateral adjustment of said means over said table or laterally beyond one side of the latter, means carried by said table and projecting laterally beyond said side for supporting the opposite end of said gage member, and means for fixing said opposite end of said gage member when over said table or in any position of said member on said supporting means against outward lateral movement relative to the latter during use of the saw comprising a gage holding member likewise adjustable at will along said supporting means, and means for at will connecting or disconnecting said last mentioned member and said supporting means.

26. In a machine tool, a table, a rotatable tool mounted thereon, two extension bars, one secured to each end of the table, each extension bar having a guideway therein, said guideways extending parallel to the axis of rotation of the tool, a work guide projecting above the plane of the table and supports for said work guide, guided in said guideways and maintaining the work-engaging surface of the work guide perpendicular to the said axis and movable over the table as well as beyond a side of the table.

27. A machine tool having a table for guiding the work and a mechanically driven rotary tool cooperating with the said table to operate upon the said work, means having guideways secured to said table, said guideways being parallel to the axis of the tool, movable supports guided in said guideways, a work guide projecting above the plane of the table and secured to said supports and having a work-guiding surface, said supports maintaining the said work-guiding surface perpendicular to the axis of the tool, and movable over the table as well as beyond a side of the table.

28. A machine tool having a table for guiding the work and a mechanically driven rotary tool cooperating with the said table to operate upon the said work, means having guideways secured to said table, said guideways being parallel to the axis of the tool, movable supports guided in said guideways, a work guide projecting above the plane of the table and secured to said supports and having a work-guiding surface, said supports maintaining the said work-guiding surface perpendicular to the axis of the tool, and movable over the table as well as beyond a side of the table, and means for securing the supports at their desired adjusted positions in the guideways, thereby firmly securing the work guide at two spaced points.

29. A circular saw having a table, a rip gage projecting above the plane of the table and separate supports for said rip gage secured to the table in front of and behind said saw respectively, both said supports extending beyond a side of the table and supporting the rip gage over the table as well as beyond said side.

30. A circular saw having a table, a rip gage projecting above the plane of the table and separate supports secured to said rip gage and secured to the table in front of and behind said saw respectively, both said supports extending beyond a side of the table and supporting the rip gage over the table as well as beyond said side.

31. A machine tool comprising a table and a mechanically-driven tool cooperating therewith, a work-guiding gage projecting above the plane of the table and separate supports for said gage secured to the table in front of and behind said mechanically-driven tool respectively, both said supports extending beyond a side of the table and supporting the gage over the table as well as beyond said side.

32. A machine tool comprising a table and a mechanically-driven tool cooperating therewith, a work-guiding gage projecting above the plane of the table and separate supports secured to said gage and secured to the table in front of and behind said mechanically-driven tool respectively, both said supports extending beyond a side of the table and supporting the gage over the table as well as beyond said side.

HERBERT E. TAUTZ.

Disclaimer 1,938,548.—*Herbert E. Tautz*, Milwaukee, Wis. MACHINE TABLE EXTENSION. Patent dated Dec. 5, 1933. Disclaimer filed Mar. 18, 1948, by the assignee, *Rockwell Manufacturing Company*.
Hereby enters this disclaimer to claim 8 in said specification.
(*Official Gazette April 20, 1948*.)

face perpendicular to the axis of the tool, and movable over the table as well as beyond a side of the table.

28. A machine tool having a table for guiding the work and a mechanically driven rotary tool cooperating with the said table to operate upon the said work, means having guideways secured to said table, said guideways being parallel to the axis of the tool, movable supports guided in said guideways, a work guide projecting above the plane of the table and secured to said supports and having a work-guiding surface, said supports maintaining the said work-guiding surface perpendicular to the axis of the tool, and movable over the table as well as beyond a side of the table, and means for securing the supports at their desired adjusted positions in the guideways, thereby firmly securing the work guide at two spaced points.

29. A circular saw having a table, a rip gage projecting above the plane of the table and separate supports for said rip gage secured to the table in front of and behind said saw respectively, both said supports extending beyond a side of the table and supporting the rip gage over the table as well as beyond said side.

30. A circular saw having a table, a rip gage projecting above the plane of the table and separate supports secured to said rip gage and secured to the table in front of and behind said saw respectively, both said supports extending beyond a side of the table and supporting the rip gage over the table as well as beyond said side.

31. A machine tool comprising a table and a mechanically-driven tool cooperating therewith, a work-guiding gage projecting above the plane of the table and separate supports for said gage secured to the table in front of and behind said mechanically-driven tool respectively, both said supports extending beyond a side of the table and supporting the gage over the table as well as beyond said side.

32. A machine tool comprising a table and a mechanically-driven tool cooperating therewith, a work-guiding gage projecting above the plane of the table and separate supports secured to said gage and secured to the table in front of and behind said mechanically-driven tool respectively, both said supports extending beyond a side of the table and supporting the gage over the table as well as beyond said side.

HERBERT E. TAUTZ.

Disclaimer 1,938,548.—*Herbert E. Tautz*, Milwaukee, Wis. MACHINE TABLE EXTENSION. Patent dated Dec. 5, 1933. Disclaimer filed Mar. 18, 1948, by the assignee, *Rockwell Manufacturing Company*.
Hereby enters this disclaimer to claim 8 in said specification.
(*Official Gazette April 20, 1948*.)